Figure 1:
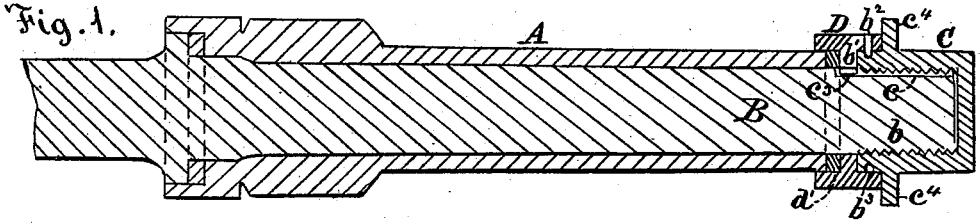

(No Model.)

M. E. BURRIS.
VEHICLE AXLE.

No. 273,458.  Patented Mar. 6, 1883.

Witnesses:
H. A. Daniels
G. B. Towles

Inventor:
M. E. Burris
By W. P. Burris
Attorney

UNITED STATES PATENT OFFICE.

MICAJAH E. BURRIS, OF BROOKLYN, NEW YORK.

VEHICLE-AXLE.

SPECIFICATION forming part of Letters Patent No. 273,458, dated March 6, 1883.

Application filed January 18, 1883. (No model.)

*To all whom it may concern:*

Be it known that I, M. E. BURRIS, a citizen of the United States of America, residing at Brooklyn, in the county of Kings and State of New York, have invented certain new and useful Improvements in Vehicle-Axles, of which the following is a specification, reference being had therein to the accompanying drawings.

This invention is designed as an improvement of my vehicle-axle patented January 30, 1883; and it consists in attaching the non-revoluble sleeve to the axle-nut, so that they may be handled as one article, and the nut may be properly entered upon the threaded end of the spindle without liability of crossing and stripping the screw-threads, as hereinafter fully described, and as shown in the drawings, in which—

Figure 2:
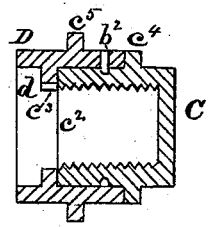
Figure 3:
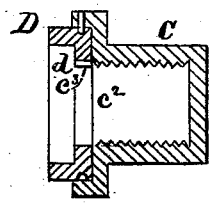
Figure 4:
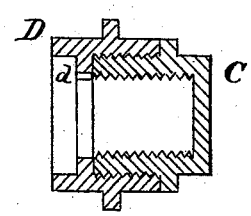
Figure 5:
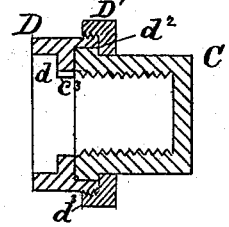
Figure 6:
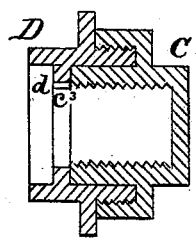
Figure 7:
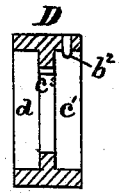

Figure 1 is a longitudinal section of an axle-box and spindle having my improved sleeve and nut attached. Figs. 2 and 3 are modifications of the sleeve and nut attached together by means of pins and annular grooves. Fig. 4 shows the sleeve and nut connected together by means of screw-threads. Figs. 5 and 6 are modifications of the sleeve and nut connected together by screw-threads. Fig. 7 is a sectional view of the sleeve detached.

A is the axle-box, and B is the spindle, having the threaded end $b$ provided with the longitudinal groove $c$. The spindle is made the same size in diameter from its outer end to the end of the axle-box.

D is my improved non-revoluble sleeve, having the cup $d$, constructed to hold the washer $d'$, and to lap the end of the axle-box, and provided in the outer end with the cup $c'$, constructed to receive and lap the end $c^2$ of the nut C. The sleeve is provided between its two cups with a bridge, $b'$, made to fit very closely over the threaded end of the spindle, and having across its entire width a lug or feather, $c^3$, made to fit very snugly in the groove $c$. The sleeve and nut are attached together by means of pins and grooves, or by screw-threads. To attach them by pins, the end $c^2$ of the nut is made to fit closely and revolve in the cup $c'$ of the sleeve, and one or more pins, $b^2$, are inserted through the sleeve into an annular groove, $b^3$, formed in the nut, as shown in Fig. 1 of the drawings. The annular groove must be made true and uniform, and the pins, made to fit snugly in the grooves, must be inserted through the sleeve in position to hold the end of the sleeve closely to the flange $c^4$ of the nut. My non-revoluble sleeve, made as set forth in the above-named patent, may be attached to the nut by means of the pins and grooves, as shown in Fig. 3 of the drawings, in which case the pins are inserted through the overlapping flange of the nut into an annular groove formed in the sleeve. To connect the sleeve and nut together by screw-threads, the sleeve and nut may be constructed and the threads formed on them, as shown in Figs. 4 and 6; or an outer sleeve, D', may be employed, made to fit over the square part of the nut, and adjusted to bear against the shoulder $d^2$ of the nut, and provided with a threaded flange, $d^3$, to fit and screw over the threaded surface of the sleeve, as shown in Fig. 5 of the drawings. The sleeve and nut thus attached together are handled as one article, and the sleeve is not liable to be mislaid or lost in handling. In adjusting them on the axle the sleeve is placed over the end of the spindle and turned either way till the feather enters the groove, and the sleeve is then pressed along the spindle till the end of the nut meets the end of the spindle, in which position the nut is held by the sleeve in right line with the spindle, so that the screw-threads necessarily enter correctly, avoiding entirely the usual liability of crossing and stripping the threads.

Instead of making the nut with the projecting flange $c^4$, as shown in Fig. 1, that flange on the nut may be made flush with the outside of the sleeve, which may be made with the projecting flange $c^5$, as shown in Fig. 2 of the drawings, which construction may be preferable in some cases to avoid the liability of contact of the nut with hubs improperly boxed.

What I claim as new, and desire to secure by Letters Patent, is—

1. The combination, with an axle-spindle, B, of the non-revoluble sleeve D, provided with the cup $d$, constructed to hold the washer $d'$, and to lap the end of the axle-box, and attached to the axle-nut, substantially as and for the purposes described.

2. The combination, with an axle-spindle,

B, of the non-revoluble sleeve D, provided in the inner end with the cup $d$, constructed to hold the washer $d'$, and to lap the end of the axle-box, and provided in the outer end
5 with the cup $c'$, to receive and lap the end of the axle-nut, and attached to the nut by devices substantially as and for the purposes described.

In testimony whereof I affix my signature in presence of two witnesses.

MICAJAH ELLIOTT BURRIS.

Witnesses:
  H. A. DANIELS,
  E. J. SWEET.